United States Patent [19]

Axelrod et al.

[11] 4,048,693  
[45] Sept. 20, 1977

[54] APPARATUS FOR REGENERATION OF FILTERS FOR ANTIDUST RESPIRATORS

[76] Inventors: Iosif Maxovich Axelrod, ulitsa Vatutina, 21, kv. 35; Anton Savvich Alengoz, ulitsa Artema, 108, kv. 27; Viktor Nikolaevich Luchko, ulitsa Pavla Popovicha, 29, kv. 8; Valentin Alexandrovich Mukhin, ulitsa Levitskogo, 27, kv. 6; Ignat Leontievich Nikolenko, ulitsa Pokrysheva, 5; Igor Alexandrovich Potapenko, prospekt Vatutina, 3, kv. 11, all of Donetsk, U.S.S.R.

[21] Appl. No.: 545,312

[22] Filed: Jan. 29, 1975

[51] Int. Cl.² .............................................. A47L 5/38
[52] U.S. Cl. ...................................... 15/310; 15/341; 55/300
[58] Field of Search ................. 15/303, 310, 311, 341; 55/291, 296, 300

[56] References Cited

U.S. PATENT DOCUMENTS

| 2,499,183 | 2/1950 | Fairgrieve | 15/310 |
| 3,733,639 | 5/1973 | Timian | 15/304 |

*Primary Examiner*—Christopher K. Moore  
*Attorney, Agent, or Firm*—Haseltine, Lake & Waters

[57] ABSTRACT

In the apparatus for regeneration of filters for antidust respirators according to the invention, a pump for blowing air through the filter comprises two coaxially mounted bellows with common bottom and top walls. The bottom wall is rigidly fixed in the casing of the apparatus and has passages for the admission of air into the space between the bellows, and for discharging dust-laden air from the interior of the inner bellows. The top wall supports an adaptor with a cover, for mounting the filter being regenerated.

The apparatus according to the invention enables the bidirectional blowing of the filter, thus improving the quality of regeneration and reducing the time required for cleaning.

5 Claims, 5 Drawing Figures

APPARATUS FOR REGENERATION OF FILTERS FOR ANTIDUST RESPIRATORS

BACKGROUND OF THE INVENTION

The present invention relates to an apparatus which is to be used in the maintenance of devices for the individual protection of respiratory organs against dust. In particular, the apparatus may be applied to the regeneration of filters for antidust respirators.

This invention may be used in the manufacture of building materials, in the chemical, mining and milling industries, as well as in agriculture, where labor conditions require the employment of devices for the individual protection of respiratory organs against dust.

Known to the field is an apparatus for the regeneration of the filters of antidust respirators. It consists of a hollow casing, a driven pump, and adapters for mounting the filter to be regenerated and for subsequently checking its resistance after regeneration.

An air throttle is arranged within the casing and communicates, via air conduits, with the adapters for measuring the resistance of a respirator with an incorporated filter or a filter. A pressure gauge is located outside the casing and fixed thereto. The throttle is used to maintain a constant air flow rate of 30 l/min.

The apparatus described above operates as follows. The filter to be regenerated is mounted with its dust-clogged side inward of facing the adapter. Then a shutter, is opened to establish communication between the adapter and the suction pipe of an air blower via the interior of the casing. The air blower is turned on, and air pumped through the filter cleans the dust from it. The cleaning operation may be accelerated by either shaking the filter or removing coarse particles of dust with a brush before connecting the filter to the apparatus. Usually, 30–40 seconds are required for cleaning one filter. In order to determine the resistance of the regenerated filter, it is removed from the adapter and placed in another adapter fixed to the casing of the apparatus. The first adapter is closed by the shutter. Then the air blower is put into operation, and air is admitted to the second adapter, via the throttle. The resistance of the clean filter is recorded by the pressure gauge.

In order to determine the resistance of a respirator incorporating the filter, a replaceable adapter is used which is mounted in place of the second adapter mentioned above. The resistance of the respirator incorporating the filter is checked in the manner already described.

This apparatus has a number of disadvantages, and one of them is that the blowing is unidirectional without intermittent shaking of the filter, so that the results of the regeneration are impaired.

Another disadvantage is that the checking of the resistance of the clean filter requires its transferral from one adapter to another, which results in an additional time loss. Furthermore, in order to check the resistance of the respirator incorporating the filter, one adapter must be replaced by another, and the operation of the apparatus becomes more complicated and time consuming. All of these disadvantages decrease the capacity of the device.

The purpose of the new invention is to provide an apparatus for the regeneration of the filters of antidust respirators through a construction which enables an improved efficiency of regeneration and an elevation of the capacity of the apparatus.

SUMMARY OF THE INVENTION

The device comprises a hollow casing, a driven pump and adapters for mounting the filter to be regenerated and for subsequently checking the resistance of the filter. The pump is accommodated in the hollow casing and consists of two coaxially mounted bellows having common top and bottom walls or end walls. The bottom wall is rigidly fixed to the casing and has a passage for the admission of air into the space between the bellows which incorporates a valve, and a passage for the discharge of air from the interior of the inner bellows. The top wall is mounted for axial reciprocation of the bellows under the action of a vibratory drive operating the pump. Mounted on this wall is an adapter to which the filter to be regenerated is attached, and a cover defining, together with the adapter, a space intermittently communicating with the space between the bellows and permanently communicating with the interior of the inner bellows.

This design provides for a bidirectional blowing of the filter concurrent with the shaking of it, while the bellows compress and stretch. The time spent for the regeneration of the filter is reduced and the quality of the regeneration is improved. In addition, the vibratory drive allows for the possibility of varying the frequency of oscillation of the movable bottom wall of the bellows, thus varying the oscillation frequency of the filter displaced in the adapter. The resistance of the regenerated filter can therefore be checked without re-installation of the filter. According to one version of the invention, in order to provide for an intermittent communication between the space separating the cover adapted assembly and the annular region between the bellows, the movable bottom is equipped with at least one bore which accommodates a valve.

This allows the air to travel a shorter path in its flow to under the adapter cover, and a reduced resistance to the air flow on the path towards the filter being regenerated. Hence, more intensive air flow is pumped through the filter.

In another embodiment of the invention, the space between the cover adapter assembly communicates with the space between the bellows via an elastic air conduit. This conduit is connected to the passage through which air is admitted to the space between the bellows via a branch of this passage, incorporating a valve.

Air supplied directly underneath the adapter cover results in a more intensive blowing of the filter and accelerates the cleaning process.

The cover should preferably have at least one rib on the inner surface serving to press the filter being regenerated against the adapter, the adapter also having at least one diametrically extending rib arranged transverse to the cover rib.

The ribs of the cover and adapter allow the filter to be rigidly attached in the adapter, thereby providing for a uniform shaking of the filter over its entire surface due to displacements of the bottom wall. Hence, the quality of the cleaning is improved.

A non-return valve can be incorporated into the passage used to discharge air from the interior of the inner bellows in order to eliminate idle strokes of the bellows.

The provision of the non-return valve allows for a double utilization of the air volume which is used to blow the filter and is enclosed in the space between the bellows to blow the filter. Hence, the quality of cleaning and the capacity of the apparatus as a whole are considered improved.

Still another embodiment of the invention provides for a stop which is fixed to the stationary bottom wall and located in the annular space between the bellows, and limits the displacement of the movable top wall.

As the movable top wall strikes the stop, the fibers of the filter material are slightly lifted, which effects a more intensive blowing of dust off the filter.

In conclusion, the apparatus for the just described regeneration of the filters of antidust respirators regenerates a filter and also allows for a method of checking the resistance of the filter after the regeneration, without having to install it.

BRIEF DESCRIPTION OF THE DRAWING

The invention will now be described in detail with reference to the specific embodiments of the device illustrated in the accompanying figures.

In these drawings.

DESCRIPTION OF THE PREFERRED EMBODIMENTS

Figure 1:
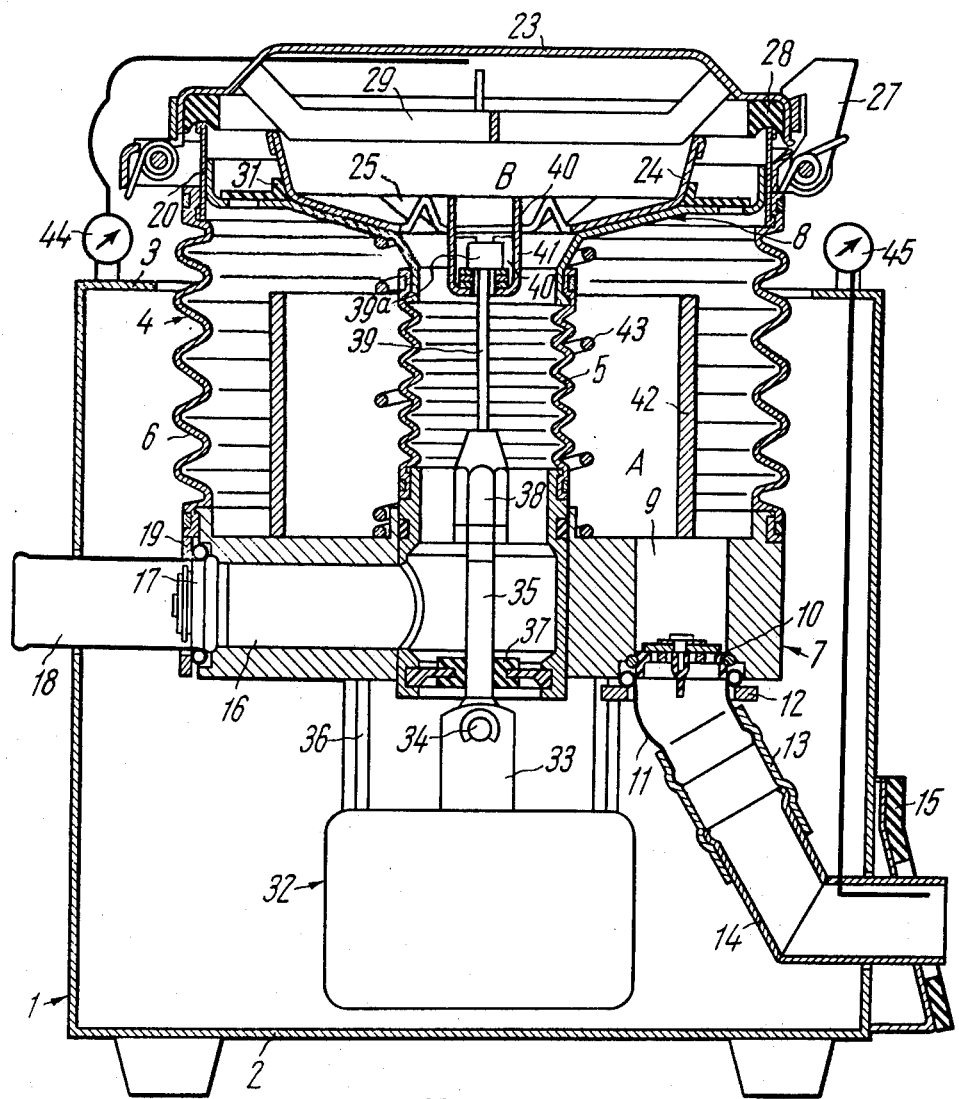
FIG. 1 shows a longitudinal section of an apparatus for the regeneration of the filters of antidust respirators derived from the invention.

The device for the regeneration of the filters of antidust respirators derived from the invention comprises a thin-walled casing 1 (FIG. 1) with a lower solid end wall 2 and an upper end wall 3 which has a centrally located opening. The casing 1 accommodates a pump 4 which consists of two coaxially mounted bellows 5 and 6 made of an elastic material. The diameter of the outer bellows 6 is dependent on the diameter of the filter to be regenerated, the capacity of the pump 4 and the structural dimensions of the apparatus. The bellows 5 and 6 have common bottom and top walls 7 and 8, respectively. The bottom wall 7 is fixed in the casing 1. The top wall 8 is displaced for the axial reciprocation of the bellows 5 and 6. A space A is defined by the region between the bellows 5 and 6, the bottom wall 7, and the top wall 8. In order to admit air into the space A, the bottom wall 7 is provided with a passage 9 incorporating a valve 10. The passage 9 communicates with a pipe 11 attached to the bottom wall 7 by a flange 12. The pipe 11 is connected by a coupling 13 to an elbow-shaped suction pipe 14 of the pump 4 which extends outside the casing 1. Furthermore, the bottom wall 7 is equipped with a passage 16 for discharging dust-laden air from the interior of the inner bellows 5. A non-return valve 17 is mounted in the passage 16 to eliminate idle strokes of the bellows 5 and 6. The passage 16 is connected to a pipe 18 attached to the bottom wall 7 by means of a flange 19. The end of the pipe 18 extends outside the casing 1.

Figure 3:
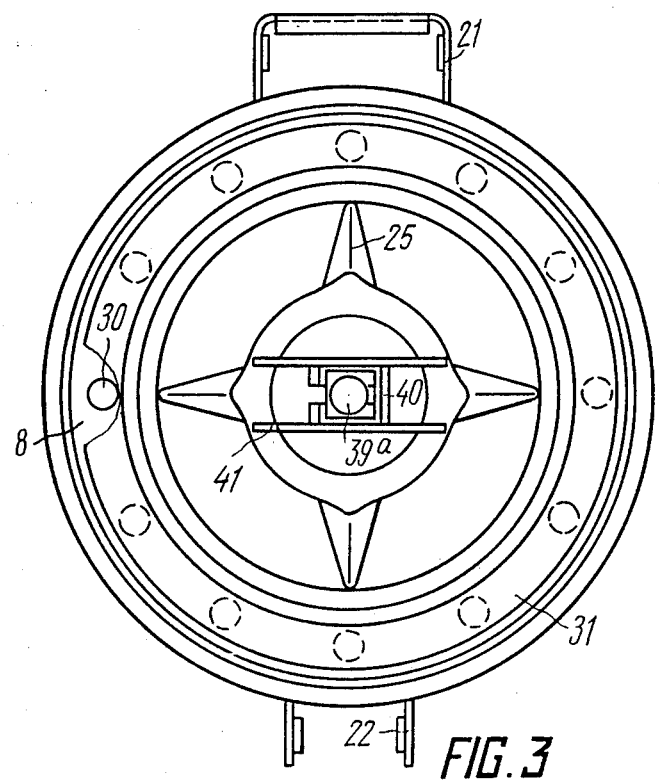
FIG. 3 shows a plane view of the adapter of the apparatus according to the invention.
Figure 4:
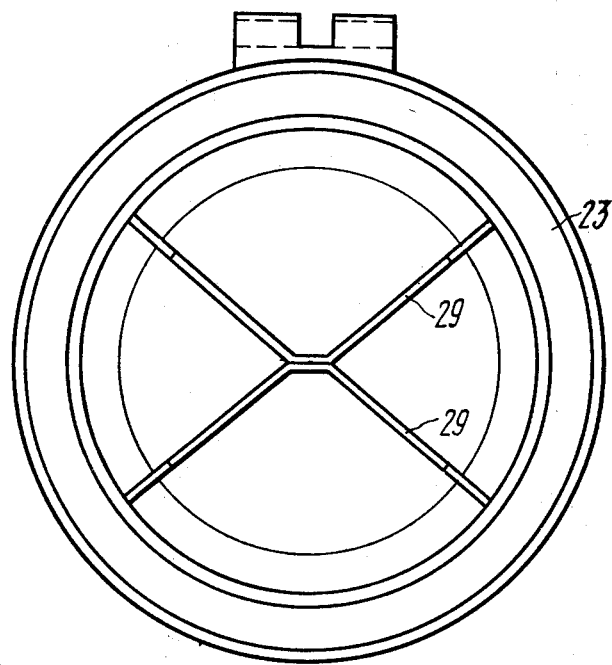
FIG. 4 shows a view, taken from below, of the adapter cover.

The top wall 8 is provided with a centrally located bore with flanged edges bent into the bellows 5 and fixed within. The outer edge of the top wall 8 is also bent upwards. A cylindrical shell 20 (FIG. 2) is mounted on the bent edge and protrudes partially into the bellows 6 and is rigidly fixed inside it. A bracket 21 and ears 22 (FIG. 3) are firmly fixed to the shell 20 for attachment of the cover 23 of an adapter 24 mounted in the top wall 8. The adapter 24 comprises a funnel with a slightly inclined bottom provided with ribs 25 for supporting the filter 26 (FIG. 2) to be regenerated. In the closed position, the cover 23 presses against the upper end face of the shell 20 by means of a spring-loaded latch 27. To seal the joint between the shell 20 and the cover 23, the latter is provided with a sealing ring 28. The cover 23 defines, together with the adapter 24, a space B. Ribs 29 (FIG. 4) are provided at the inner surface of the cover 23 for pressing the filter 26 (FIG. 2) being regenerated against the adapter 24 which has its diametrically extending ribs 25 arranged transverse to the ribs 29 of the cover 23. When the cover 23 is closed, the distance from the ribs 29 of the cover to the ribs 25 of the adapter 24 corresponds to the height of the filter 26 being regenerated, and the filter is rigidly fixed in the adapter 24.

The top wall 8 is provided with a centrally located bore with flanged edges bent into the bellows 5 and fixed within. The outer edge of the top wall 8 is also bent upwards. A cylindrical shell 20 (FIG. 2) is mounted on the bent edge and protrudes partially into the bellows 6 and is rigidly fixed inside it. A bracket 21 and ears 22 (FIG. 3) are firmly fixed to the shell 20 for attachment of the cover 23 of an adapter 24 mounted in the top wall 8. The adapter 24 comprises a funnel with a slightly inclined bottom provided with ribs 25 for supporting the filter 26 (FIG. 2) to be regenerated. In the closed position, the cover 23 presses against the upper end face of the shell 20 by means of a spring-loaded latch 27. To seal the joint between the shell 20 and the cover 23, the latter is provided with a sealing ring 28. The cover 23 defines, together with the adapter 24, a space B. Ribs 29 (FIG. 4) are provided at the inner surface of the cover 23 for pressing the filter 26 (FIG. 2) being regenerated against the adapter 24 which has its diametrically extending ribs 25 arranged transverse to the ribs 29 of the cover 23. When the cover 23 is closed, the distance from the ribs 29 of the cover to the ribs 25 of the adapter 24 corresponds to the height of the filter 26 being regenerated, and the filter is rigidly fixed in the adapter 24.

The top wall 8 is provided with equally spaced openings 30 (FIG. 2) around its circumference, designed so that space A can communicate with space B.

The openings 30 (FIG. 2) are covered by the plate valve 31 so that air can flow only in the direction from the space A to the space B.

Another embodiment of the invention involves the mounting of the plate valve in each of the openings.

The pump 4 of the apparatus is provided with a vibratory drive 32 mounted in the casing 1 below the bellows 5 and 6.

The vibratory drive 32 has an anchor 33 comprising the core of an electromagnet which is connected by means of a pivot 34 to a drawbar 35 extending along the axis of the bellows 5 and 6. The vibratory drive 32 is fixed by means of studs 36 to the bottom wall 7. The bottom wall 7 has a centrally located opening with a seal 37 for the passage of the drawbar 35. A rope 39 is fixed to the upper end of the drawbar 35 by means of a nut 38, and the other end of the rope is fixed to a bush 39a. The bush 39a is received by a shackle 40 mounted between stops 41 which are rigidly fixed to the throat formed by the flanged edge of the central opening of the upper wall 8.

A stop 42 for limiting the displacement of the upper bottom wall 8 is fixed to the stationary bottom wall 7, the stop being displaced in the annular space A between the bellows 5 and 6. A spring 43 for returning the top wall 8, the adapter 24, and the bellows 5 and 6 into the initial position is also displaced in this space.

Figure 2:
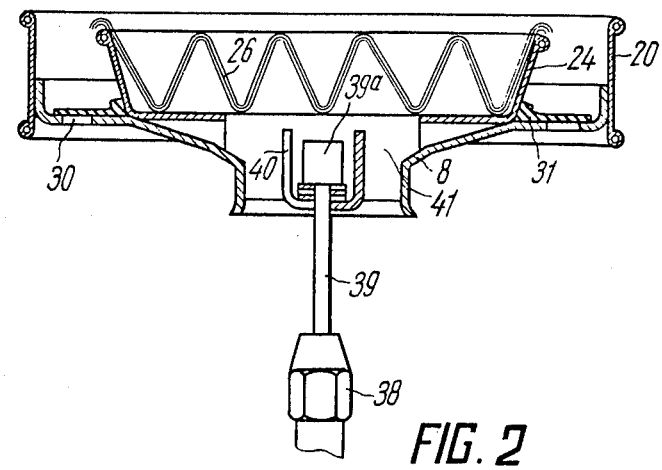
FIG. 2 shows a longitudinal section of an adapter and a movable top wall.

Two micropressure gauges 44 and 45 are fixed to the casing 1. One of them simultaneously measures the pressures in the space B between the cover 23 and the adapter 24, and the interior of the inner bellows 5. The difference in these pressure valves determines the resistance of the filter 26 (FIG. 2). The micropressure gauge 45 measures the pressure in the section pipe 14 of the pump 4, and atmospheric pressure. The difference in these pressure values determines the resistance of a respirator incorporating the regenerated filter. In addition, control pushbuttons and signal lamps (not shown) for controlling the apparatus are also located on the upper wall 3 of the casing 1. The vibratory drive 32 is selected so that the force developed by it is sufficient to compress the bellows 5 and 6 and the spring 43, and a blow from the movable top wall 8 on which the adapter 24 is mounted to the filter 26 (FIG. 2) at the stop 42.

Figure 5:
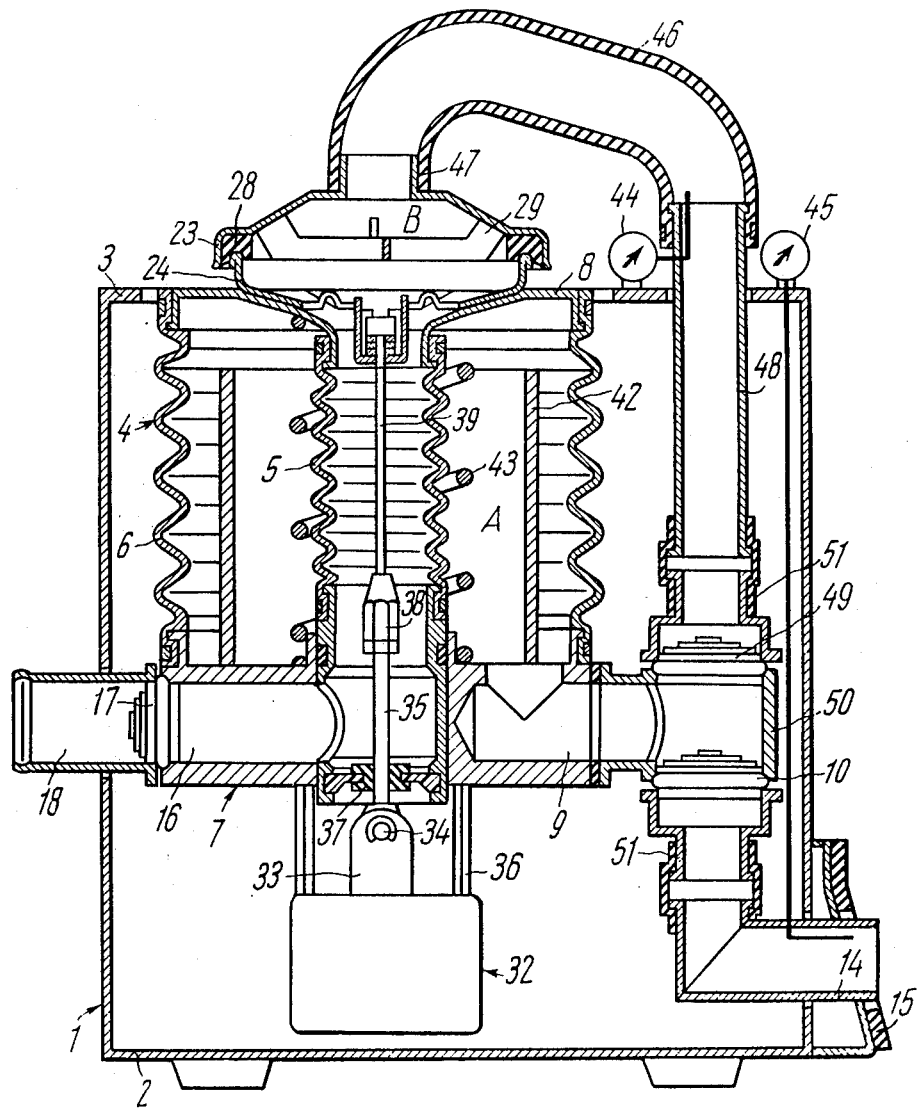
FIG. 5 shows a longitudinal section of another embodiment of an apparatus for the regeneration of the filters of antidust respirators obtained from the invention.

FIG. 5 shows an embodiment of the apparatus, where the space A defined by the region between the bellows 5 and 6 and the walls 7 and 8, communicates with the space B defined by the region between the cover 23 and the adapter 24 via an elastic air conduit 46. For that purpose, the cover 23 is provided with a centrally located bore terminating in a pipe 47 which receives one end of the air conduit 46. The other end of the conduit 46 is attached to a pipe 48 located within the casing 1 and partially extending beyond it. The pipe 48 is a branch of the suction pipe 14 of the pump 4, and therefore, it communicates with the passage 9 which admits air to the space A. The pipe 48 incorporates a valve 49 which is mounted in a valve box 50 along with the valve 10. The pipe is connected to the valve box 50 at the side of the valve 10 by a coupling 51, and the pipe 48, with the elastic air conduit 46, is connected to the valve box at the side of the valve 49.

In the remaining aspects, this embodiment of the apparatus is identical to that described above.

The elastic conduit 46 enables the air to flow directly under the cover 23, thereby contributing to a more intensive blowing of the filter 26.

The apparatus derived from the invention operates in the following manner. In the initial position, before the operation begins, the power supply of the vibratory drive is switched in. A signal lamp located on the upper end wall 3 of the casing 1, will be then switched in. All valves are closed. The bellows 5 and 6 are in the expanded position.

The filter 26 (FIG. 2) to be regenerated is placed with its dust-clogged side facing the adapter 24, the cover 23 is closed to clamp the filter 26 (FIG. 2) between the ribs 25 and 29, and the latch 27 is blocked. The seal 28 is thus tightly pressed against the end face of the shell 20 to seal the space B between the cover 23 and the adapter 24. Then a voltage is applied to the coil of the electromagnet of the vibratory drive 32 and the anchor 33 is drawn towards the coil. The drawbar 35 to the adapter 24 is displaced downwards. Since the adapter 24 is rigidly fixed to the movable bottom wall 8, the latter also moves downwards to compress the bellows 5 and 6, thus performing the work stroke, and also the spring 43. The top wall 8 moves downward until it strikes the stop 42 which is fixed to the stationary bottom wall 7, and located between the bellows 5 and 6. Upon striking the stop, the dust is removed from the filter 26 being regenerated to penetrate the interior of the inner bellows 5. As a result of the compression of the bellows 5 and 6, and extra pressure is developed in the space A and the valves 31 in the top wall 8 are opened under the action of this pressure. Air is admitted into the space B between the cover 23 and the adapter 24 at the side of the filter 26 (FIG. 2) which is free of dust. At the same time, the air in the interior of the inner bellows 5 flows through the valve 17 and the pipe 18 during the compression of the bellows.

As a result of blowing the filter 26 with air under pressure, dust is cleaned from it. The air blown through the filter penetrates the interior of the inner bellows 5, which entraps the dust, and is removed through the passage 16 of the bottom wall and the valve 17 to the exterior of the casing 1.

When the coil of the vibratory drive 32 is deenergized, the spring 43 and the bellows 5 and 6 tend to return to the initial position, whereby the movable top wall 8 together with the adapter 24 and the filter 26 (FIG. 2), are moved upwards. A reduced pressure is established in the space A, and the valve 10 is opened under the action of atmospheric pressure. Air is admitted to the space A through the suction pipe 14, valve 10, and passage 9, while the air from space B flows through the filter 26 (FIG. 2) being regenerated into the interior of the inner bellows 5 and into the passage 16 in the bottom wall 7. Due to the fact that during the return movement of the bellows 5 and 6 the pressure in the spaces A and B is below atmospheric pressure, the valve 17 cannot be opened, and the air from the space A is admitted to the interior of the inner bellows 5 through the valve 31 which control the openings in the movable top wall 8.

Thus, the air flows through the filter 26 (FIG. 2) being regenerated in one and the same direction, both during the movement of the adapter 24 downwards and upwards; that is, during both the work and return strokes of the bellows 5 and 6.

Operation cycles of the pump 4 are repeated until the filter 26 (FIG. 2) is completely cleaned. Experiments have shown that for the efficient regeneration of filters made of non-woven polymeric materials with ultra-fine fibers, 200–500 l/min of air should be pumped through. This capacity of the pump 4 is provided by an oscillation frequency of the vibratory drive 32 of the order of 10–15 Hz. The regeneration time for one filter 26 (FIG. 2) is established by experiment, and is from 20 to 30 seconds.

The resistance of the cleaned filter 26 (FIG. 2) and the quality of its regeneration are evaluated on the basis of an extra pressure valve under the cover 23 (in mm of water column) which is determined by means of the micropressure gauge 44. The resistance of the filter 26 (FIG. 2) is determined with a constant air flow rate of 30 l/min, which is indicative of the ventilation of human lungs while performing a medium amount of mechanical work. In accordance with the physiological standards, the resistance to respiration should not be greater than 10 mm of water column.

This capacity of the pump 4 is achieved by increasing the oscillation frequency of the vibratory drive 32 by about a factor of 2 in comparison with the frequency required for the regeneration of the filter 26 (FIG. 2). Thus, the stroke of the bellows 5 and 6 becomes shorter, whereby the bottom wall 8 will not strike against the stop 42, and the capacity of the pump 4 becomes as low as 30 l/min.

The apparatus derived from the present invention may also be used for measuring the resistance of the respirator incorporating the filter 26 (FIG. 2) because the total resistance of the respirator is strictly specified. For that purpose, the pump is adjusted to have a capacity of 30 l/min. The micropressure gauge 45 indicates the value of reduced pressure in the pipe 14, and this value of reduced pressure in the pipe 14, and this value constitutes the basis for the assessment of the persistance of the respirator and its suitability for use.

The operation of the apparatus described with reference to FIG. 5 is identical to that of the device just described, except for the following. Upon compression of the bellows 5 and 6, the air pressure in the space A increases to cause the valve 49 to open, and air is admitted through the air conduit 46 to the space B and also, via the filter 26 (FIG. 2) being regenerated, to the interior of the bellows 5. Upon the return of the bellows 5 and 6 to the initial position, the pressure in the space A is reduced and valve 10 opens under the action of atmospheric pressure. Air is admitted, via the pipe 14, valve box 50 and passage 9 to the space A. The remainder of the operation of the apparatus is identical to that of the previously described embodiment.

We claim:

1. An apparatus for regeneration of filters for antidust respirators comprising: a hollow casing; two coaxially mounted bellows with common end walls and a vibratory drive forming a driven pump; one of the end walls of said bellows being rigidly fixed in said casing; said bellows comprising an inner bellows and an outer bellows with a space therebetween; a first passage for admitting air from the outside of said casing to said space between said bellows, and a second passage for discharging air from the internal space of said inner bellows to the outside of said casing, said passages passing through said one end wall; a one-way valve mounted in said first passage for admitting air thereto; the other end wall of said bellows being mounted in said casing and connected to said vibratory drive for reciprocation axially of said bellows; an adapter with a cover attached thereto being also attached to said other end wall, said adapter and said cover defining a filter receiving space therebetween for mounting a filter to be regenerated; first means communicating the internal space of said inner bellows with said filter receiving space; second means communicating the space between said bellows with said filter receiving space; and a nonreturn valve mounted in said second passage for eliminating an idle stroke of the bellows; said filter to be regenerated having a clean side and a soiled side; said vibratory device being connected to said other end wall for moving said bellows to blow air through said filter in a direction from said filter receiving space to the interior space of said inner bellows, said filter being mounted in said filter receiving space, the clean side of said filter being at the upstream side of the blown air and the soiled side of said filter being at the downstream side of said filter 2. An apparatus according to claim 1, wherein the cover has at least one rib at the internal surface thereof to urge the filter to be regenerated against the adapter, said adapter also having at least one diametrically extending rib arranged transversely with respect to the cover rib.

3. An apparatus according to claim 1, including a stop limiting the displacement of the movable end wall fixed to the stationary end wall and located in the space between the bellows.

4. An apparatus according to claim 1 wherein second means includes an elastic air conduit connected between said first passage and said filter receiving space.

5. An apparatus according to claim 1 wherein said second communicating means includes at least one opening in said other end wall.

* * * * *